(12) United States Patent
Suzuki et al.

(10) Patent No.: US 7,014,912 B2
(45) Date of Patent: Mar. 21, 2006

(54) LOW REFLECTIVE ANTISTATIC HARDCOAT FILM

(75) Inventors: Hiroko Suzuki, Shinjuku-Ku (JP); Takahiro Niimi, Shinjuku-Ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 09/960,391

(22) Filed: Sep. 24, 2001

(65) Prior Publication Data

US 2002/0068156 A1    Jun. 6, 2002

Related U.S. Application Data

(63) Continuation of application No. 09/266,578, filed on Mar. 11, 1999.

(30) Foreign Application Priority Data

Mar. 17, 1998    (JP)    ................................. 10-67428

(51) Int. Cl.
*B32B 3/00*    (2006.01)
(52) U.S. Cl. .................... 428/208; 428/323; 428/331; 428/332; 428/446; 428/451
(58) Field of Classification Search ............... 428/208, 428/323, 331, 332, 421, 446, 480
See application file for complete search history.

(56) References Cited

U.S. PATENT DOCUMENTS

| | | | | |
|---|---|---|---|---|
| 4,765,729 A | * | 8/1988 | Taniguchi | .................... 351/163 |
| 5,312,868 A | | 5/1994 | Abe et al. | .................... 525/124 |
| 5,742,118 A | | 4/1998 | Endo et al. | ................. 428/325 |
| 5,744,227 A | * | 4/1998 | Bright et al. | ................ 428/216 |
| 5,908,585 A | | 6/1999 | Shibuta | ....................... 428/922 |
| 5,925,438 A | * | 7/1999 | Ota et al. | ..................... 428/141 |
| 5,981,059 A | * | 11/1999 | Bright et al. | ................ 428/336 |
| 6,033,743 A | | 3/2000 | Suzuki et al. | ................... 428/1 |
| 6,064,524 A | | 5/2000 | Oka et al. | .................... 359/582 |
| 6,146,753 A | * | 11/2000 | Niimi et al. | ................. 428/332 |
| 6,319,594 B1 | * | 11/2001 | Suzuki et al. | ................ 428/208 |
| 6,503,627 B1 | * | 1/2003 | Niimi et al. | ................. 428/409 |

* cited by examiner

*Primary Examiner*—Monique R. Jackson
(74) *Attorney, Agent, or Firm*—Oliff & Berridge PLC (57) ABSTRACT

A low reflective antistatic film is provided which can prevent electrostatic deposition of foreign materials on the surface thereof, has hardness enough high not to cause a deterioration in transparency derived from a scratch or the like created upon being rubbed, and can prevent reflection of outdoor daylight from the surface of a transparent substrate. The low reflective antistatic film comprises: a transparent substrate film; and, provided on the transparent substrate film in the following order, a transparent conductive layer, a hardcoat layer, and a low refractive layer, the low refractive layer having a lower refractive index than the hardcoat.

4 Claims, 4 Drawing Sheets

LOW REFLECTIVE ANTISTATIC HARDCOAT FILM

The present application is a continuation of Ser. No. 09/266,578, filed Mar. 11, 1999, now U.S. Pat. No. 6,319,594.

BACKGROUND OF THE INVENTION

The present invention relates to a film that has dust-proof properties and scratch resistance and at the same time can fully prevent surface reflection, and more particularly to a low reflective antistatic transparent film that can prevent soiling created by deposition of dust, on the surface of various displays of word processors, computers, and televisions, surfaces of polarizing plates used in liquid crystal displays, optical lenses, such as sunglass lenses of transparent plastics, lenses of eyeglasses, finder lenses for cameras, covers for various instruments, and surfaces of window glasses of automobiles and electric rail cars, and in addition possesses excellent scratch resistance and can prevent reflection of outdoor daylight from the surface thereof.

Glass, plastic and other transparent substrates are used in curved mirrors, back mirrors, goggles, and window glasses, particularly displays of electronic equipment, such as personal computers and word processors, and other various commercial displays. Plastic transparent substrates, as compared with glass substrates, are lightweight and less likely to be broken, but on the other hand, they are disadvantageous in that dust is electrostatically deposited on the surface thereof and, in addition, the hardness is so low that the scratch resistance is poor and, hence, scratches created by rubbing, scratching or the like deteriorate the transparency. Further, a problem common to transparent substrates is that viewing of visual information, such as objects, letters, or figures, through transparent substrates, or viewing of images from the reflective layer through the transparent substrate in mirrors causes outdoor daylight to be reflected from the surface of the transparent substrates, making it difficult to view internal visual information.

Conventional methods for preventing the electrostatic deposition of dust and the deterioration in transparency due to scratches in plastic substrates include coating of an antistatic paint on the surface of the plastic substrates and formation of a hardcoat on the surface of the plastic substrates. The hardcoat with a conductive material, such as an antistatic agent, being dispersed in an amount large enough to prevent the deposition of foreign materials, however, has unsatisfactory transparency and is further disadvantageous in that curing of the hardcoat is inhibited making it impossible to provide hardness high enough to meet the scratch resistance requirement. A highly transparent conductive thin film can be formed by vapor deposition of a metal oxide or the like on plastic substrates. The step of vapor deposition, however, suffers from poor productivity and high cost and, in addition, unsatisfactory scratch resistance.

On the other hand, provision of a low refractive layer on a hardcoat is considered as a method for preventing the reflection of light from the surface of the transparent substrate. Although this can prevent the surface reflection to some extent, relying only on the low refractive layer cannot provide the antistatic effect.

DISCLOSURE OF THE INVENTION

Accordingly, it is an object of the present invention to provide a low reflective antistatic film which, when used in various displays and the like to distinguish visual information, such as objects, letters, and figures, through a transparent substrate or when used in viewing an image from a mirror through the transparent substrate from the reflective layer side, can prevent electrostatic deposition of foreign materials on the surface of the transparent substrate, has hardness enough high not to cause a deterioration in transparency derived from a scratch created by rubbing, and can prevent reflection of outdoor daylight from the surface of the transparent substrate.

The above object of the present invention can effectively be attained by a low reflective antistatic hardcoat film comprising: a transparent substrate film; and, provided on the transparent substrate film in the following order, a transparent conductive layer, a hardcoat layer, and a low refractive layer, the low refractive layer having a lower refractive index than the hardcoat layer.

BEST MODE FOR CARRYING OUT THE INVENTION

The present invention will be described in more detail with reference to the following embodiments.

Figure 1:
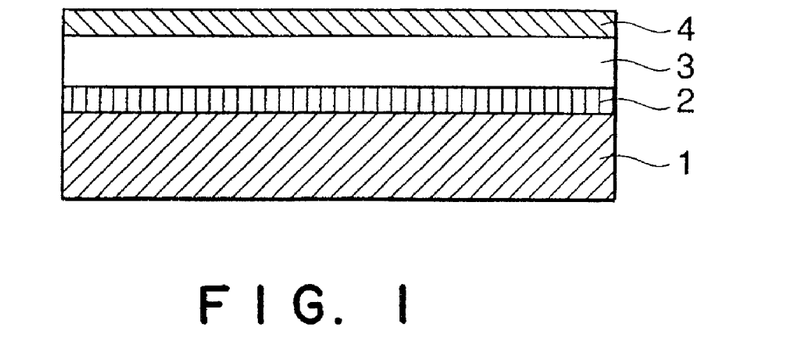
FIG. 1 is a schematic cross-sectional view showing the fundamental construction of the low reflective antistatic hardcoat film according to the present invention.

FIG. 1 is a schematic cross-sectional view showing one embodiment of the low reflective antistatic hardcoat film according to the present invention. The low reflective antistatic hardcoat film according to this embodiment comprises a transparent conductive layer 2, a hardcoat layer 3, and a low refractive layer 4 provided in that order on a transparent substrate film 1.

According to the present invention, any transparent plastic film may be used as the transparent substrate film, and examples thereof include unstretched, monoaxially, or biaxially stretched films of thermoplastic polymers, such as cellulose or di- or triacetate, cellulose acetate butyrate, polyester, polyamide, polyimide, polyether sulfone, polysulfone, polypropylene, polymethylpentene, polyvinyl chloride, polyvinyl acetal, polyether ketone, methyl polymethacrylate, polycarbonate, and polyurethane. Among them, monoaxially or biaxially stretched polyester films are preferred from the viewpoint of excellent transparency and heat resistance, and cellulose triacetate films are preferred because they are not anisotropic in transparency and optical properties. The thickness of the transparent substrate film is preferably about 8 to 1000 µm.

The transparent conductive layer may be formed on the substrate film by conventional methods, for example, a method wherein a conductive coating liquid containing conductive fine particles and a reactive curing resin is coated and a method wherein a metal or a metal oxide capable of forming a transparent film is vapor deposited or sputtered to form a conductive thin layer. The conductive layer may be formed on the substrate film either directly or through a primer layer that can enhance the bonding. The coating may be carried out by any method without particular limitation, and the best suited method may be selected from conventional methods, for example, roll coating, gravure coating, bar coating, and extrusion coating, according to the properties and coverage of the coating liquid.

Conductive fine particles which may be used in the formation of the transparent conductive layer according to the present invention include fine particles of antimony-doped indium-tin oxide (hereinafter referred to as "ATO") and indium-tin oxide (ITO). Metals and metal oxides which may be used in the formation of the conductive thin film by sputtering or the like include, for example, gold, nickel, ATO, ITO, and zinc oxide/aluminum oxide. Besides the formation of the transparent conductive layer using conductive fine particles or by forming a conductive thin film, the transparent conductive layer may be formed using conductive polymers, such as polypyrrole and polyaniline.

Any reaction curing resin may be used in the formation of the conductive layer according to the present invention without particular limitation so far as the resin has good adhesion to the substrate film and is resistant to light and moisture, and has good adhesion to the hardcoat layer formed on the transparent conductive layer. An example of the reaction curing resin is an ionizing radiation curing resin (including its precursor), for example, comprising an alkyd resin, an oligomer or a prepolymer of an (meth)acrylate (the term "(meth)acrylate" used therein referring to both acrylate and methacrylate) of a polyfunctional compound such as a polyhydric alcohol, and a relatively large amount of a reactive diluent.

Reactive diluents usable herein include: monofunctional monomers, such as ethyl (meth)acrylate, ethylhexyl (meth)acrylate, styrene, vinyltoluene, and N-vinylpyrrolidone; and polyfunctional monomers, for example, trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

When use of the ionizing radiation curing resin as an ultraviolet curing resin is contemplated, a photopolymerization initiator, such as an acetophenone, a benzophenone, Michler's benzoyl benzoate, α-amyloxime ester, or a thioxanthone, or a photosensitizer, such as n-butylamine, triethylamine, or tri-n-butylphosphine, is incorporated into the resin.

The ionizing radiation curing resin may be used in combination with the following reactive organosilicon compound. The reactive organosilicon compound may be used in an amount of 10 to 100% by weight based on the total amount of the ionizing radiation curing resin and the reactive organosilicon compound. In particular, when the following ionizing radiation curing organosilicon compound (3) is used, the conductive layer may be formed using only this compound as the resin component.

(1) Silicon Alkoxide

The silicon alkoxide is a compound represented by the formula $R_mSi(OR')_n$ wherein R and R' each represent an alkyl group having 1 to 10 carbon atoms and m and n are each an integer, provided that m+n=4.

Examples of silicon alkoxides usable herein include tetramethoxysilane, tetraethoxysilane, tetra-iso-propoxysilane, tetra-n-propoxysilane, tetra-n-butoxysilane, tetra-sec-butoxysilane, tetra-tert-butoxysilane, tetrapentaethoxysilane, tetrapenta-iso-propoxysilane, tetrapenta-n-propoxysilane, tetrapenta-n-butoxysilane, tetrapenta-sec-butoxysilane, tetrapenta-tert-butoxysilane, methyltrimethoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylpropoxysilane, dimethylbutoxysilane, methyldimethoxysilane, methyldiethoxysilane, and hexyltrimethoxysilane.

(2) Silane Coupling Agent

Examples of ionizing radiation curing silicon compounds usable herein include organosilicon compounds, containing a plurality of groups capable of being reaction crosslinked upon exposure to an ionizing radiation, for example, polymerizable double bond groups, having a molecular weight of not more than 5,000. This type of reactive organosilicon compounds includes polysilanes terminated on one end with a vinyl functional group, polysilanes terminated on both ends with a vinyl functional group, polysiloxanes terminated on one end with a vinyl functional group, polysiloxanes terminated on both ends with a vinyl functional group, and vinylfunctional polysilanes or vinyl-functional polysiloxanes obtained by reacting these compounds. Specific examples of reactive organosilicon compounds usable herein include the following compounds.

(A)

(B)

(C)

(D)

(E)

wherein $R^1$ and $R^2$ each independently represent an alkyl group having 1 to 4 carbon atoms, and a to d and n are each such a number as will bring the molecular weight of the compound to not more than 5,000.

Other compounds usable herein include (meth)acryloxysilane compounds, such as 3-(meth)acryloxypropyltrimethoxysilane and 3-(meth)acryloxypropylmethyldimethoxysilane.

The conductive layer comprising a reaction curing resin composition with conductive fine particles added thereto may be cured by a conventional method for curing an ionizing radiation curing resin, that is, by irradiation with an electron beam or ultraviolet light. For example, when curing with an electron beam is contemplated, use may be made of electron beams having an energy of 50 to 1000 KeV, preferably 100 to 300 KeV, emitted from various electron beam accelerators, such as Cockcroft-Walton accelerator, van de Graaff accelerator, resonance transformer, insulated core transformer, linear, dynamitron, and high-frequency electron accelerators. In the case of ultraviolet curing, ultraviolet light emitted from light sources, such as ultrahigh pressure mercury lamps, high pressure mercury lamps, low pressure mercury lamps, carbon arc, xenon arc, and metal halide lamps, may be utilized.

Preferably, the transparent conductive layer thus formed has a surface resistivity of not more than $10^{12}$ Ω/□. The thickness of the conductive layer is generally 0.5 to 6 μm, preferably 1 to 5 μm. When the thickness is less than 0.5 μm, it is difficult to bring the surface resistivity of the conductive layer provided on the transparent substrate film to not more than $10^{12}$ Ω/□. On the other hand, when the thickness exceeds 6 μm, the transparency of the conductive layer is sometimes lost.

The hardcoat provided on the transparent conductive layer is a layer that has a hardness high enough to withstand scratching and is not significantly detrimental to the electrical conductivity. The hardcoat may be generally formed by coating. Reaction curing resins, reactive organosilicon compounds and the like usable in the formation of the conductive layer may also be used in the formation of the hardcoat. The amount of the reactive organosilicon compound used may be in the above range (10 to 100% by weight). When the amount of the reactive organosilicon compound used is less than 10% by weight, the adhesion between the hardcoat layer and the low refractive layer provided on the hardcoat layer is unsatisfactory. As with the conductive layer, the hardcoat layer may be formed using only the ionizing radiation curing silicon compound (3) as the resin component. The coating method and the curing method may be the same as those described above in connection with the formation of the conductive layer. The term "hardcoat layer" used herein refers to a coat having a hardness of H or higher as measured by a pencil hardness test specified in JIS K 5400.

The hardcoat layer according to the present invention may be formed of only the above reaction curing resin, such as an ionizing radiation curing resin, or the reactive organosilicon compound. In this case, even though the hardcoat layer per se is not conductive, the surface resistivity measured on the hardcoat layer indicates that the antistatic effect can be attained by virtue of the effect of the underlying conductive layer. As described below, the thickness of the low refractive layer is much smaller than that of the hardcoat layer, so that the formation of the low refractive layer on the hardcoat layer does not cause deterioration in antistatic effect, such as surface resistivity. In order to attain better antistatic properties, the hardcoat layer is preferably such an anisotropic conductive layer that the volume resistivity in the direction of the plane of the layer ($P_{VH}$) is at least ten times larger than the volume resistivity in the direction of the thickness of the layer ($P_{VV}$), that is, $P_{VH} \geq 10 \times P_{VV}$. In this case, the volume resistivity in the direction of the thickness of the layer ($P_{VV}$) is preferably not more than $10^8$ Ω·cm. When the volume resistivity in the direction of the thickness of the layer exceeds $10^8$ Ω·cm, the antistatic properties of the finally obtained film is unfavorably unsatisfactory. Conductive fine particles may be used in order to render the hardcoat layer anisotropically conductive. Preferred conductive fine particles are polystyrene, acrylic resin, epoxy resin, polyamide resin, polyurethane resin and other organic beads that have been surface treated with gold and/or nickel. The average particle diameter of the surface treated organic beads is preferably about 5 μm.

According to the present invention, bringing the refractive index of the hardcoat layer to higher than that of the low refractive layer can further lower the reflectance of the low reflective antistatic hardcoat film of the present invention.

The refractive index of the conventional hardcoat layer is about 1.48 to 1.52, while the refractive index of the hardcoat layer according to the present invention is preferably about 1.55 to 2.50. When the hardcoat layer is a high refractive, anisotropic conductive layer, the antistatic properties and the low reflectance of the surface can be further improved.

In order to render the hardcoat layer highly refractive, metals having a high refractive index or ultrafine particles of metal oxides may be added to the hardcoat-forming resin component. In the present invention, preferred ultrafine particles having a high refractive index are those having a particle diameter of 1 to 50 nm and a refractive index of about 1.60 to 2.70. Specific examples thereof include impalpable powders of ZnO (refractive index 1.90), $TiO_2$ (refractive index 2.3 to 2.7), $CeO_2$ (refractive index 1.95), $Sb_2O_5$ (refractive index 1.71), $SnO_2$, ITO (refractive index 1.95), $Y_2O_3$ (refractive index 1.87), $La_2O_3$ (refractive index 1.95), $ZrO_2$ (refractive index 2.05), and $Al_2O_3$ (refractive index 1.63).

Further, resins containing molecules or atoms as a high refractive component may be added to the reaction curing resin composition for the hardcoat layer. Molecules and atoms usable as the high refractive component include halogen atoms other than fluorine, sulfur, nitrogen, and phosphorus atoms, and aromatic rings. Methods usable for forming a hardcoat using the reaction curing resin composition comprising the above components include one that comprises dissolving or dispersing the above components in a suitable solvent to form a coating liquid, coating the coating liquid directly on the conductive layer and curing the coating, and one that comprises coating the coating liquid onto a release film, curing the coating, and transferring the cured coating onto the conductive layer with the said of a suitable adhesive. When the formation of the hardcoat layer by the transfer is contemplated, it is possible to use a method that comprises forming a low refractive layer described below on a release film, forming a hardcoat layer on the low refractive layer, and transferring both the layers onto the conductive layer. The thickness of the hardcoat layer thus formed is generally about 1 to 50 μm, preferably about 3 to 20 μm.

Next, the formation of a low refractive layer on the hardcoat layer provides the low reflective antistatic hardcoat film of the present invention. Methods usable for forming the low refractive layer include a conventional method wherein an about 0.08 to 0.2 μm-thick thin layer of $MgF_2$, $SiO_X$, wherein $1 \leq X \leq 2$, or the like is formed by vacuum deposition or a vapor phase process, such as sputtering or plasma chemical vapor deposition (CVD), and a method wherein an $SiO_2$ gel film is formed from a sol containing an $SiO_2$ sol. Further, a film of a low refractive resin, for example, a fluororesin, such as a copolymer of vinylidene fluoride with hexafluoropropylene, or a silicon-containing vinylidene fluoride copolymer may also be formed as the low refractive layer. According to the present invention, a low refractive layer formed of $SiO_x$, such as $SiO_2$, is preferred from the viewpoint of better adhesion to the hardcoat. In order that the antistatic hardcoat film of the present invention has low reflectance, the refractive index of the low refractive layer should be lower than that of the hardcoat, preferably not more than 1.47, more preferably 1.40 to 1.45.

Figure 2:
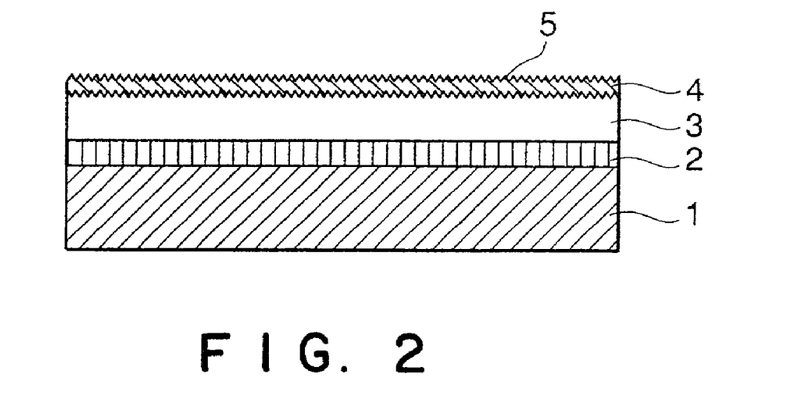
FIG. 2 is a schematic cross-sectional view showing another embodiment of the low reflective antistatic hardcoat film having an irregular surface according to the present invention.

FIG. 2 shows an embodiment wherein fine irregularities 5 are provided on the surface of the antireflective antistatic film to impart antiglare properties to the antireflective film. The fine irregularities may be formed by any conventional method, for example, a method using a matte hardcoating material with inorganic or organic beads dispersed therein, or a method wherein a matte film is used to perform transfer. For example, when the hardcoat is formed by transfer, a method may be used which comprises providing, as a substrate film for a transfer material, a matte film having fine irregularities on its surface, coating a coating liquid for a hardcoat on the film, curing the coating, and transferring the hardcoat onto the surface of the conductive layer optionally through an adhesive or the like to impart fine irregularities 5 to the surface of the hardcoat.

Another example of the transfer method comprises coating a coating liquid for a hardcoat on the surface of the conductive layer, drying the coating, applying a matte film as described above onto the surface of the resin layer, and, in this state, curing the resin layer, followed by separation of the matte film to transfer the fine irregularities of the matte film onto the surface of the hardcoat. In any event, since the low refractive layer provided on the surface of the hardcoat having fine irregularities is thin, fine irregularities appear on the surface of the low refractive layer.

In the low reflective antistatic hardcoat film according to the present invention, layers for imparting various functions may be additionally provided in addition to the layers described above. For example, an adhesive layer or a primer layer may be provided in order to improve the adhesion between the transparent substrate film and the hardcoat. Further, the hardcoat may be constituted by a plurality of layers in order to improve the hard properties. The refractive index of the additional layer(s) provided between the transparent substrate film and the hardcoat is preferably between the refractive index of the transparent substrate film and the refractive index of the hardcoat.

The additional layer may be formed by coating a desired coating liquid directly or indirectly on the transparent substrate film. When the hardcoat is formed by transfer onto the transparent substrate film, a method may be used that comprises coating a coating liquid for an additional layer (an adhesive layer or the like) onto a hardcoat previously provided on a release film, laminating the release film having thereon the hardcoat and the additional layer onto a transparent substrate film so that the coating on the release film faces the transparent substrate film, and then separating the release film, thereby transferring the hardcoat and the additional layer onto the transparent substrate film. A pressuresensitive adhesive may be coated onto the underside of the low reflective antistatic film according to the present invention, and, in use, this low reflective antistatic film may be applied to such an object that reflection and the deposition of dust caused by electrification should be prevented, for example, to polarizing elements.

The low reflective antistatic film of the present invention thus obtained is useful for the prevention of the reflection of light from and the deposition of dust by electrification on the surface of various displays of word processors, computers, televisions, and plasma display panels, surfaces of polarizing plates used in liquid crystal displays, optical lenses, such as sunglass lenses of transparent plastics, lenses of eyeglasses, finder lenses for cameras, covers for various instruments, and surfaces of window glasses of automobiles and electric rail cars. The film of the present invention can maintain the transparency on such a level that recognition of images viewed through the film is not hindered.

The following examples and comparative examples further illustrate the present invention in more detail. In the following description, "parts" and "%" are by weight unless otherwise specified.

EXAMPLE 1

A low reflective antistatic hardcoat film having a construction shown in FIG. 1 was prepared by the following method. At the outset, one side of a 188 µm-thick polyester film A-4350 (a substrate film 1, manufactured by Toyobo Co., Ltd.) was coated with Shintron C 4456-S7 (tradename; a hardcoating agent with ATO dispersed therein (solid content 45%), manufactured by Shinto Paint Co., Ltd.). The coating was dried and then cured by irradiation with ultraviolet light to form a 1 µm-thick conductive layer 2. An ionizing radiation curing resin PET-D31 (tradename of a hardcoating agent, manufactured by Dainichiseika Color & Chemicals Manufacturing Co., Ltd.) was diluted with toluene and then coated on the conducive layer 2, and the coating was then dried. The dried coating was cured by irradiation with an ionizing radiation to form a 7.5 µm-thick hardcoat 3. An $SiO_2$ sol (DTP-1, manufactured by Sumitomo Osaka Cement Co., Ltd.) was coated onto the hardcoat, and the coating was then dried and cured to form a 100 nm-thick low refractive layer 4.

EXAMPLE 2

Figure 3:
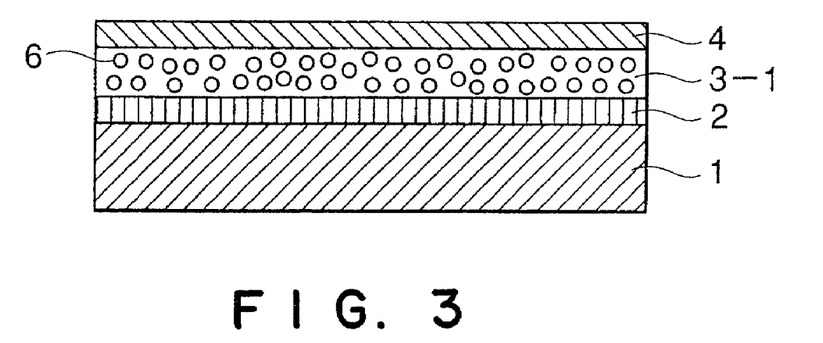
FIG. 3 is a schematic cross-sectional view of a low reflective antistatic hardcoat film prepared in Example 2.

A low reflective antistatic hardcoat film having an anisotropic conductive hardcoat shown in FIG. 3 was prepared as follows. At the outset, a 1 µm-thick conductive layer 2 was formed on one side of a substrate 1 in the same manner as in Example 1. A coating liquid prepared by dispersing Bright 20GNR4,6-EH (tradename; conductive fine particles constituted by organic beads having an average particle diameter of 5 µm which have been surface treated with gold and nickel, manufactured by The Nippon Chemical Industrial Co., Ltd.) 6 in PET-D31 used in Example 1 to a concentration of 0.1% and diluting the dispersion with toluene was then coated onto the conductive layer 2. The coating was then dried and cured by irradiation with an ionizing radiation to form a 7.5 µm-thick hardcoat 3-1. A low refractive layer 4 was formed on the surface of the hardcoat in the same manner as in Example 1.

EXAMPLE 3

Figure 4:
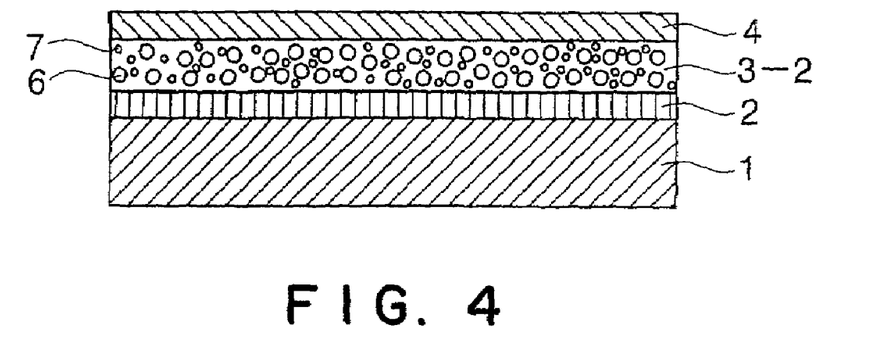
FIG. 4 is a schematic cross-sectional view of a low reflective antistatic hardcoat film prepared in Example 3.

A low reflective antistatic hardcoat film having a high refractive, anisotropic conductive hardcoat shown in FIG. 4 was prepared as follows. In the same manner as in Example 1, a conductive layer 2 was formed on a substrate film 1, and a coating liquid comprising 66.6% of a silicone hardcoat resin (X-12-2400-3, manufactured by The Shin-Etsu Chemical Co., Ltd), 33.3% of a dispersion of ultrafine $ZrO_2$ particles (ZD100, solid content %, manufactured by Sumitomo Osaka Cement Co., Ltd.), and 0.1% of conductive fine particles of the type described above (Bright 20GNR4,6-EH) was coated on the conductive layer 2, followed by drying and curing of the coating to form a high refractive hardcoat 3-2. Finally, a low refractive layer 4 was formed on the hardcoat in the same manner as in Example 1.

EXAMPLE 4

Figure 5:
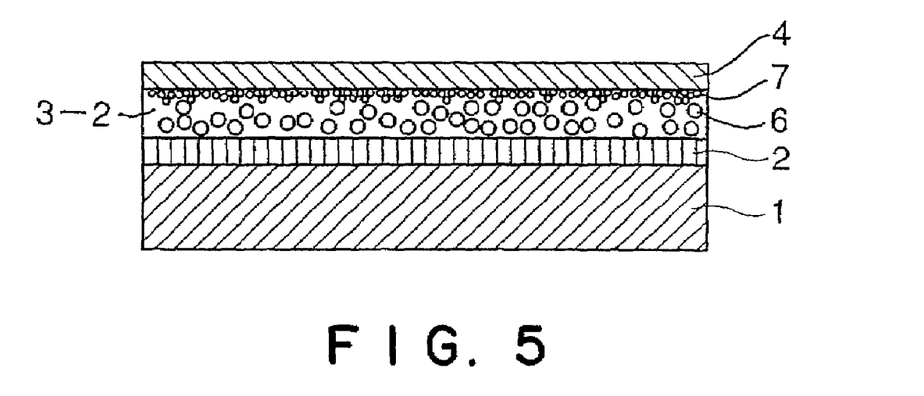
FIG. 5 is a schematic cross-sectional view of a low reflective antistatic hardcoat film prepared in Example 4.

A low reflective antistatic hardcoat film having a high refractive, anisotropic conductive hardcoat shown in FIG. 5 was prepared as follows. An 80 μm-thick cellulose triacetate film (TD-UV-80, manufactured by Fuji Photo Film Co., Ltd.) was provided as a substrate film. A 1 μm-thick conductive layer 2 was formed on one side of the substrate film in the same manner as in Example 1. Next, a dispersion of $ZrO_2$ ultrafine particles as prepared in Example 3 was coated onto a 50 μm-thick release PET film (Diafoil T100, manufactured by Diafoil Co., Ltd.). The coating was then dried and cured to form a 100 nm-thick layer 7 of ultrafine particles. Subsequently, a coating liquid for the same hardcoat as used in Example 2 (except that the ionizing radiation curing resin was EXG-40-77, manufactured by Dainichiseika Color & Chemicals Manufacturing Co., Ltd.) was coated onto the layer of ultrafine particles to a thickness of 5 μm on a dry basis, and the coating was then dried. The surface of the uncured hardcoat thus formed was put on the conductive layer. The hardcoat was then cured by irradiation with an ionizing radiation. The release film was then separated to form a hardcoat layer 3-2 and the layer 7 of ultrafine particles in that order on the conductive layer 2. Finally, a 100 nm-thick $SiO_X$ layer (a low refractive layer) 4 was formed on the layer 7 of ultrafine particles by plasma CVD.

EXAMPLE 5

Figure 6:
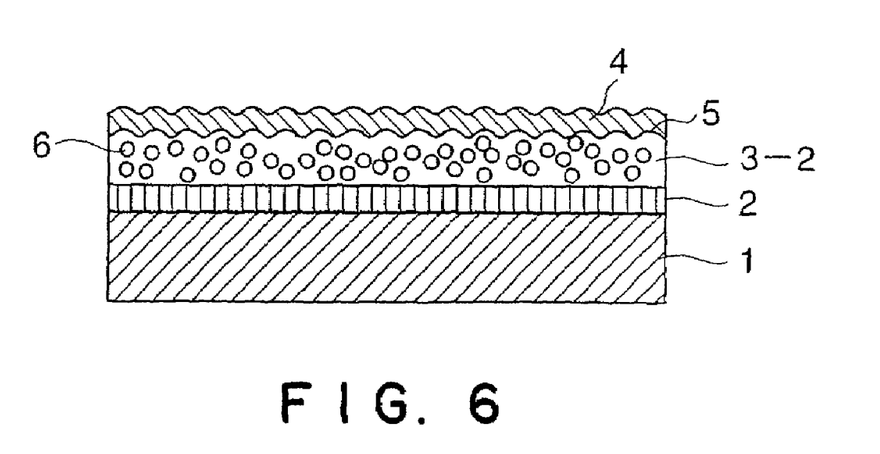
FIG. 6 is a schematic cross-sectional view of a low reflective antistatic hardcoat film prepared in Example 5.

A conductive layer was formed on a substrate in the same manner as in Example 1. Next, a "matte conductive coating liquid" having the following composition was coated on the conductive layer 2. The coating was dried and then cured by irradiation with an ionizing radiation to form a 7.5 μm-thick anisotropic conductive hardcoat 3-2 having a matte surface. The procedure of Example 1 was repeated to form a low refractive layer 4 having a matte surface on the anisotropic conductive hardcoat 3-2. Thus, a low reflective antistatic hardcoat film shown in FIG. 6 was formed which comprised the substrate film 1 and, provided on the substrate film 1, three layers of the conductive layer 2, the anisotropic conductive hardcoat 3-2 having a matte surface, and the low refractive layer 4 having a matte surface.

Composition of Matte Conductive Coating Liquid (Solid Content Ratio)

| | |
|---|---|
| Silica (average particle diameter 1.5 μm) | 3 parts |
| Bright 20 GNR4, 6-EH (conductive fine particles) | 0.1 part |
| Seika Beam EXG40-77 (5-2) | 100 parts |

(Seika Beam: tradename; an ionizing radiation curing resin, manufactured by Dainichiseika Color & Chemicals Manufacturing Co., Ltd.)

EXAMPLE 6

A low reflective antistatic hardcoat film was prepared in the same manner as in Example 1, except that the low refractive layer was a thin layer of $SiO_X$ formed by plasma CVD. Evaluation results were substantially the same as those in Example 1.

EXAMPLE 7

A low reflective antistatic hardcoat film was prepared in the same manner as in Example 2, except that the low refractive layer was formed by coating a silicon-containing fluororesin (tradename TM004, manufactured by JSR) solution onto the surface of the hardcoat. Evaluation results were substantially the same as those in Example 2.

COMPARATIVE EXAMPLE 1

Figure 7:
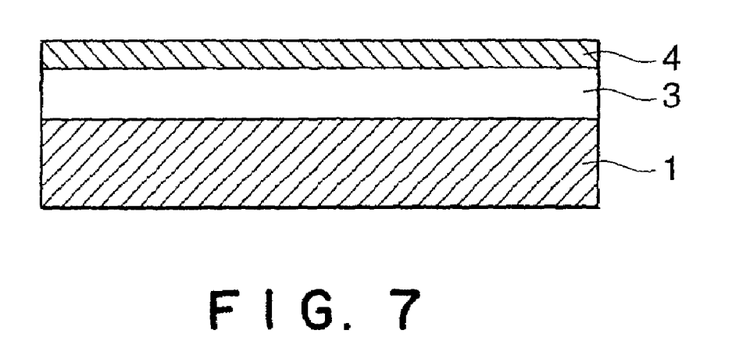
FIG. 7 is a schematic cross-sectional view of a low reflective hardcoat film prepared in Comparative Example 1.

A low reflective hardcoat film shown in FIG. 7 was prepared in the same manner as in Example 1, except that the conductive layer was not formed.

COMPARATIVE EXAMPLE 2

Figure 8:
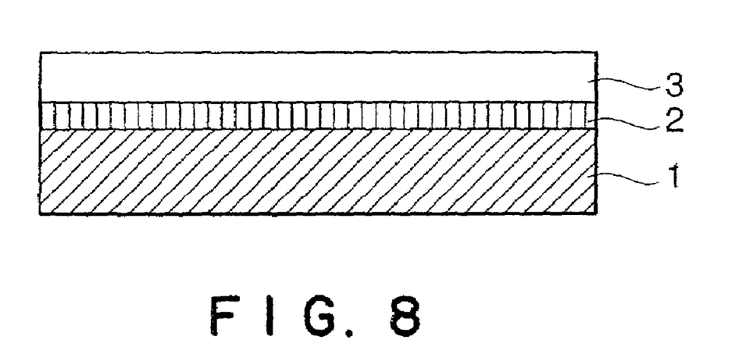
FIG. 8 is a schematic cross-sectional view of an antistatic hardcoat film prepared in Comparative Example 2.

An antistatic hardcoat film shown in FIG. 8 was prepared in the same manner as in Example 1, except that the low refractive layer was not formed.

COMPARATIVE EXAMPLE 3

Figure 9:
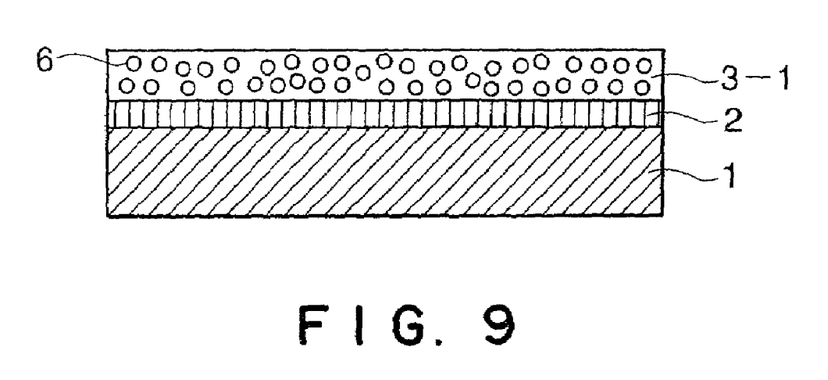
FIG. 9 is a schematic cross-sectional view of an antistatic hardcoat film prepared in Comparative Example 3.

An antistatic hardcoat film shown in FIG. 9 was prepared in the same manner as in Example 2, except that the low refractive layer was not formed.

COMPARATIVE EXAMPLE 4

Figure 10:
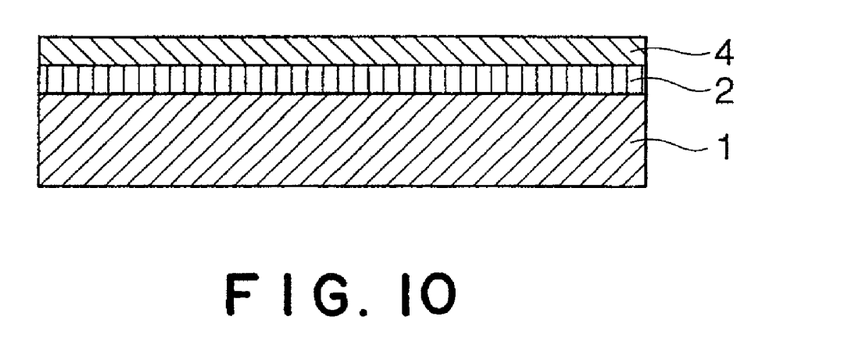
FIG. 10 is a schematic cross-sectional view of a low reflective antistatic film prepared in Comparative Example 4.

A low reflective antistatic film shown in FIG. 10 was prepared in the same manner as in Example 1, except that the hardcoat was not formed.

COMPARATIVE EXAMPLE 5

Figure 11:
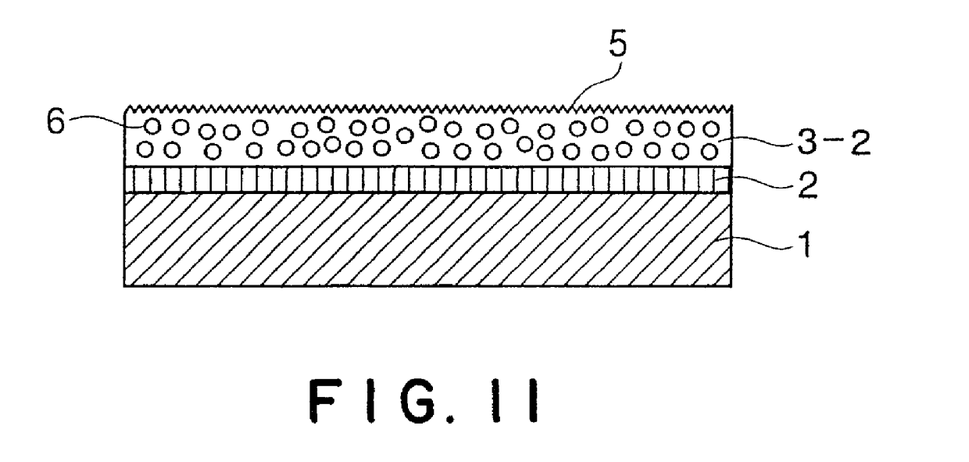
FIG. 11 is a schematic cross-sectional view of an antistatic hardcoat film prepared in Comparative Example 5.

An antistatic hardcoat film shown in FIG. 11 was prepared in the same manner as in Example 5, except that the low refractive layer was not formed.

For film samples of the examples and the comparative examples, the following items were evaluated. The results are shown in Tables 1 and 2.

Total light transmittance of laminate: The total light transmittance was measured with "Reflection Transmissometer HR-100," manufactured by Murakami Color Research Laboratory.

Pencil hardness: A pencil for evaluation (MITSUBISHI UNI 2H) was reciprocated five strokes on the sample using a "simplified pencil scratch tester," manufactured by Takuma Seiko Co., Ltd. under conditions of load 1 kg and 10 mm. The sample was then visually inspected for scratches. The number of strokes, in which the scratch was not created, was determined to evaluate the pencil hardness.

Surface resistivity: The surface resistivity was measured with a "Resistivity Meter MCP-HT 260," manufactured by Mitsubishi Chemical Corporation each time after the formation of each of the layers. In this case, 1st layer represents the measured value for the layer coated directly on the substrate film, 2nd layer represents the measured value for the hardcoat film with the low refractive layer not provided on the first layer, 2nd layer* represents the measured value for the case where only the 2nd layer was coated directly on the substrate film, and whole represents the measured value for the case where the low reflective antistatic film was formed.

Minimum reflectance: The minimum reflectance at visual light wavelengths 380–780 nm as measured with a spectral reflectometer MPC-3100, manufactured by Shimadzu Seisakusho Co., Ltd.

Antireflection effect: The antireflection effect was evaluated as ○ when the minimum reflectance was less than 2%; as Δ when the minimum reflectance was 2 to 3%; and as X when the minimum reflectance exceeded 3%.

Antistatic effect: The antistatic effect was evaluated as ○ when the surface resistivity value was on a lower level (not more than $10^{12}$ Ω/□) than the surface resistivity value ($10^{13\text{-}14}$ Ω/□) of the conventional hardcoat, indicating that the film had antistatic effect; and as X when the surface resistivity value was on a level found in the conventional hardcoat, indicating that the film had no antistatic effect.

Evaluation of hardness: The number of strokes X, in which the scratch was not created in reciprocation of a pencil on the sample five strokes in the pencil hardness test, was determined and expressed as X/5. The hardness was evaluated as ○ when the number of times was 5/5; and as X when the number of times was less than 5/5.

Thus, according to the present invention, a low reflective antistatic film can be provided which, when used in various displays and the like to distinguish visual information, such as objects, letters, and figures through a transparent substrate or when used in viewing an image from a mirror through the transparent substrate from its reflective layer side, can prevent electrostatic deposition of foreign materials on the surface of the transparent substrate, has hardness high enough not to cause a deterioration in transparency due to a scratch created upon being rubbed, and can prevent reflection of outdoor daylight from the surface of the transparent substrate. The above film of the present invention can maintain the transparency on such a level that recognition of images viewed through the film is not hindered.

What is claimed is:

1. A low reflective antistatic hardcoat film comprising:
   a transparent substrate film;
   a transparent conductive layer formed on the transparent substrate film;
   a hardcoat layer formed on the transparent conductive layer, the hardcoat layer comprising an anisotropic conductive layer of which the volume resistivity in the direction of the plane in the layer is higher than the volume resistivity in the layer thickness direction, the hardcoat layer comprising a plurality of layers; and
   a low refractive layer formed on the hardcoat layer, the low refractive layer having a lower refractive index than the hardcoat layer.

2. The low reflective antistatic hardcoat film according to claim 1, wherein fine irregularities are formed on a surface of the hardcoat layer and/or a surface of the low refractive layer.

3. The low reflective antistatic hardcoat film according to claim 1, wherein the hardcoat layer comprises the reaction product of a reaction curing resin composition.

4. The low reflective antistatic hardcoat film according to claim 1, wherein the hardcoat layer has a high refractive index.

TABLE 1

| Evaluation items | Surface resistivity, Ω/□ | | | | Pencil hardness | Total light transmittance, % | Minimum reflectance, % |
| --- | --- | --- | --- | --- | --- | --- | --- |
| | 1st layer | 2nd layer | 2nd layer* | Whole | | | |
| Ex. 1 | $2 \times 10^7$ | $2 \times 10^{12}$ | $2 \times 10^{14}$ | $2 \times 10^{12}$ | 5/5 | 90.8 | 1.8 |
| Ex. 2 | $2 \times 10^7$ | $2 \times 10^7$ | $5 \times 10^{13}$ | $2 \times 10^7$ | 5/5 | 90.4 | 1.8 |
| Ex. 3 | $2 \times 10^7$ | $3 \times 10^7$ | $4 \times 10^{13}$ | $3 \times 10^7$ | 5/5 | 92.9 | 1.3 |
| Ex. 4 | $2 \times 10^7$ | $2 \times 10^7$ | $5 \times 10^{13}$ | $2 \times 10^7$ | 5/5 | 93.4 | 0.2 |
| Ex. 5 | $2 \times 10^7$ | $2 \times 10^7$ | $5 \times 10^{14}$ | $2 \times 10^7$ | 5/5 | 91.5 | 1.5 |
| Ex. 6 | $2 \times 10^7$ | $2 \times 10^{12}$ | $2 \times 10^{14}$ | $2 \times 10^{12}$ | 5/5 | 90.8 | 1.8 |
| Ex. 7 | $2 \times 10^7$ | $2 \times 10^7$ | $2 \times 10^{13}$ | $2 \times 10^7$ | 5/5 | 90.4 | 1.8 |
| Comp. Ex. 1 | $2 \times 10^{14}$ | — | — | — | 5/5 | 90.5 | 1.8 |
| Comp. Ex. 2 | $2 \times 10^6$ | $2 \times 10^7$ | $4 \times 10^{13}$ | $2 \times 10^7$ | 5/5 | 90.1 | 4.3 |
| Comp. Ex. 3 | $2 \times 10^7$ | $2 \times 10^7$ | $5 \times 10^{13}$ | $2 \times 10^7$ | 5/5 | 90.1 | 4.5 |
| Comp. Ex. 4 | $2 \times 10^7$ | — | $5 \times 10^{13}$ | — | 0/5 | 68.7 | 1.0 |
| Comp. Ex. 5 | $2 \times 10^7$ | $2 \times 10^7$ | $5 \times 10^{13}$ | $2 \times 10^7$ | 5/5 | 89.3 | 2.6 |

TABLE 2

| Evaluation items | Antireflection effect | Antistatic effect | Evaluation of hardness |
| --- | --- | --- | --- |
| Ex. 1 | ○ | ○ | ○ |
| Ex. 2 | ○ | ○ | ○ |
| Ex. 3 | ○ | ○ | ○ |
| Ex. 4 | ○ | ○ | ○ |
| Ex. 5 | ○ | ○ | ○ |
| Ex. 6 | ○ | ○ | ○ |
| Ex. 7 | ○ | ○ | ○ |
| Comp. Ex.1 | ○ | X | ○ |
| Comp. Ex.2 | X | ○ | ○ |
| Comp. Ex.3 | X | ○ | ○ |
| Comp. Ex.4 | ○ | ○ | X |
| Comp. Ex.5 | Δ | ○ | ○ |

* * * * *